Feb. 22, 1927. 1,618,864
D. M. DEAN
APPARATUS FOR MOLDING ARTICLES FROM PLASTIC SUBSTANCES
Filed May 19, 1922 2 Sheets-Sheet 1
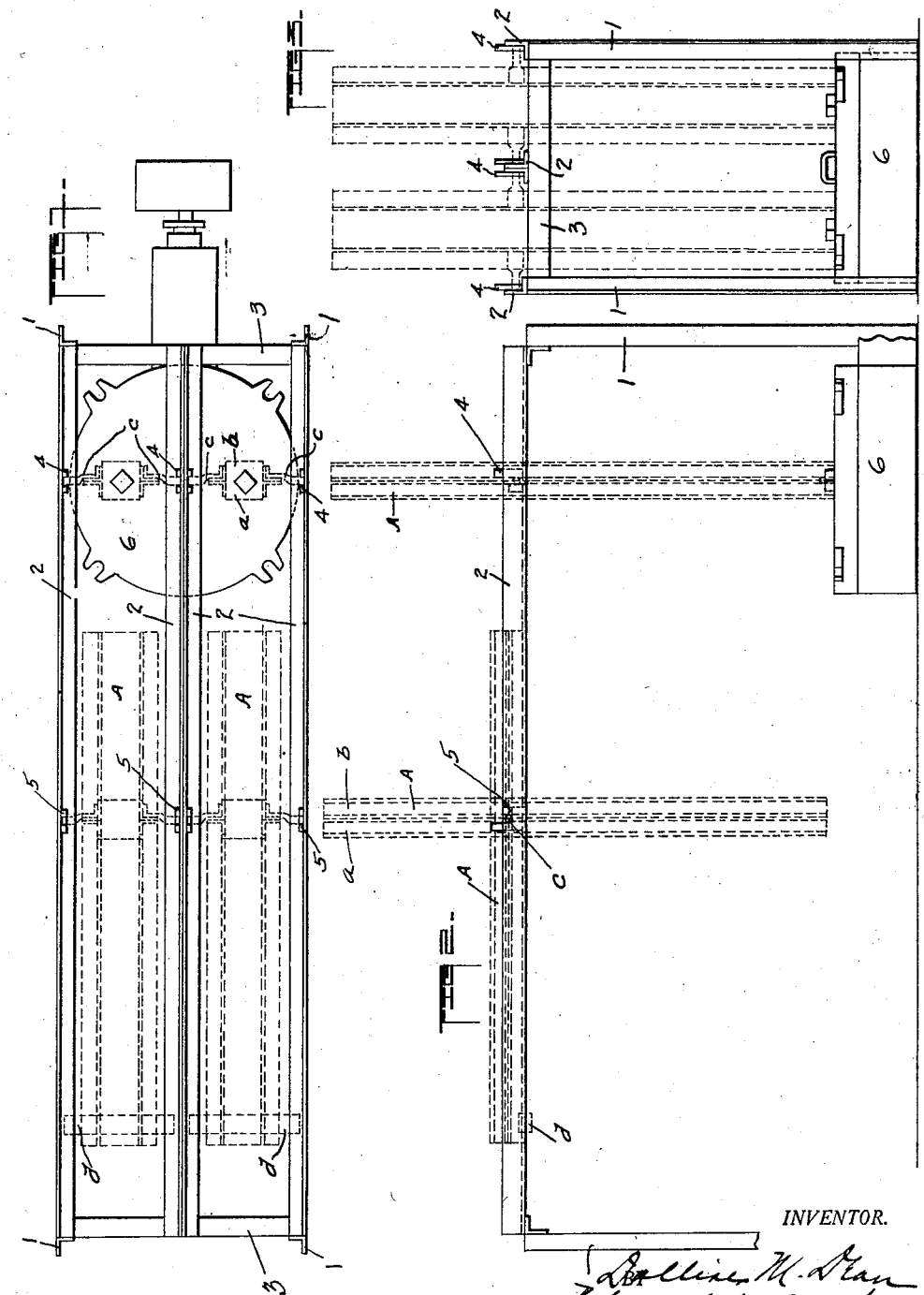
INVENTOR.

Feb. 22, 1927. 1,618,864
D. M. DEAN
APPARATUS FOR MOLDING ARTICLES FROM PLASTIC SUBSTANCES
Filed May 19, 1922    2 Sheets-Sheet 2
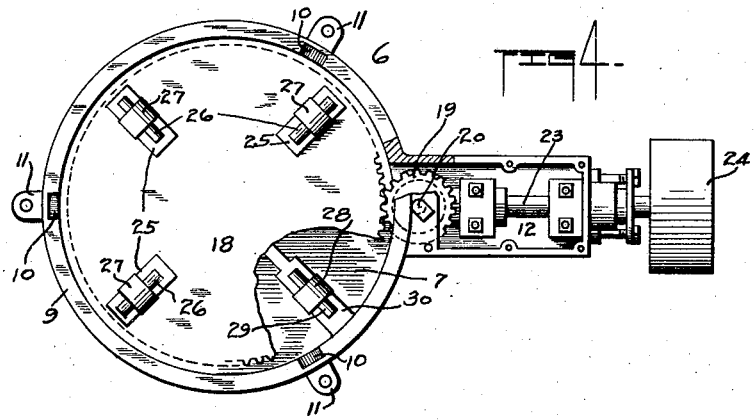
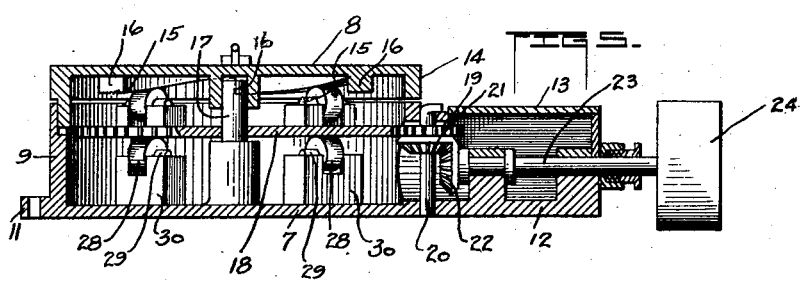
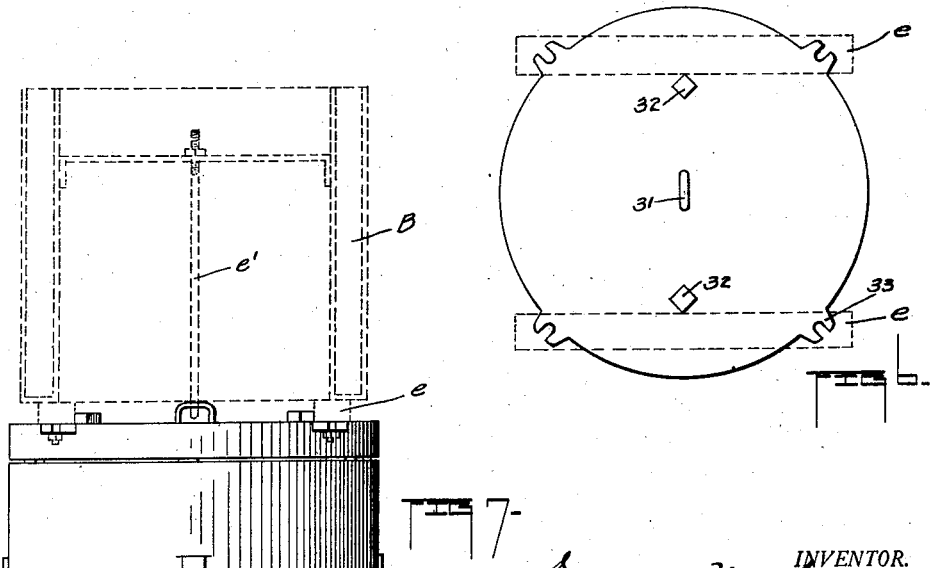
INVENTOR.
BY
ATTORNEYS.

Patented Feb. 22, 1927.

1,618,864

UNITED STATES PATENT OFFICE.

DOLLIVER M. DEAN, OF PEORIA, ILLINOIS, ASSIGNOR OF ONE-HALF TO MARK R. DEYO, OF PEORIA, ILLINOIS.

APPARATUS FOR MOLDING ARTICLES FROM PLASTIC SUBSTANCES.

Application filed May 19, 1922. Serial No. 562,161.

This invention has reference to a method and apparatus for molding and tamping articles of concrete or other plastic substances.

The invention has for its principal object the method of molding and tamping articles of plastic substances, which consists in first—pouring the mold and during such pouring subjecting the mold to an alternate raising and lowering action, the latter step being an abrupt drop; second—transferring the mold and supporting the same in a position for rotation, and finally removing the molded substance by rotating the mold into positions permitting the mold sections to be removed from said molded substance.

The invention has for a further object to provide a tamper upon which is adapted to rest a mold suitably guided to permit perpendicular movement thereof, and means connected with the tamper to forcibly lift the mold and then let it drop, such action being carried on intermittently and at predetermined intervals.

That the invention may be more fully understood, reference is had to the accompanying drawings, forming a part of the description and illustrating a preferred embodiment of the invention, in which:—

Figure 1 is a plan view of an apparatus for practicing my method, dotted lines illustrating tamping and removing positions;

Figure 2 is an elevation of Figure 1, parts being broken away;

Figure 3 is an end view of Figure 2;

Figure 4 is a plan view of the tamping part of the apparatus, parts being removed and parts being broken away;

Figure 5 is a longitudinal sectional view thru the tamping part of the apparatus;

Figure 6 is a top plan view of the lifting and dropping ring or plate, and

Figure 7 is an elevation showing by dotted lines a modified means of sustaining one form of mold on the tamper.

Like characters of reference denote corresponding parts throughout the figures.

The apparatus in its simplest form comprises a plurality of uprights or standards 1, preferably supporting two sets or series of spaced parallel rails 2, the inner rails of each set or series being preferably arranged back to back, each set of rails being connected at their ends by cross-braces 3. In the form shown the standards, as well as the rails are made of angle-iron bars. The opposite rails of each set, approximately intermediate their ends, and near one end are provided with trunnion receiving bearings 4 and 5, respectively; the base of the trunnion seats 5 being raised slightly above the flat face of the rails 2, see Figure 2, for purposes which will be explained.

Preferably removably located at one end of the apparatus is the tamper 6 adapted to rest on the floor or platform supporting the standards 1 of the apparatus. This tamper is preferably cylindrical in shape and includes the base 7 and the lifting and dropping ring or plate 8. Said base is formed or provided with an upstanding annular flange or ring 9 having a plurality of spaced vertically arranged seats or notches 10. For bolting the base to its support the ears 11 are provided. Extending laterally from the base 7 is a housing 12, which is preferably formed integral with the base, and provided with a removable cover plate 13. The ring or plate 8 is formed or provided with a depending annular flange or ring 14 of substantially the same diameter as the ring or flange 9 of the base and overlies the same in working position, and said ring or flange 14 is provided with a plurality of spaced vertically arranged lugs or extensions adapted to fit and have up and down movement in the seats or notches 10 in the base. Said ring or plate 8 on the underside is formed or provided with an annular row of cam faces 15 connected with each other by off-sets or steps 16. These cam faces taper from the full depth or thickness of the off-sets or steps 16 to the surface of the ring or plate 8, as shown in Figure 5. The ring or plate 8 is guided centrally by a vertically disposed stem 17 on which is journaled to rotate a large plate gear wheel 18, the teeth of which mesh with the teeth of a pinion 19 carried on a short shaft 20 journaled in the housing 12 and on which is also carried a bevel gear wheel 21 meshing with a gear wheel 22 on a driving shaft 23 journaled in said housing 12 and protruding therefrom to receive a pulley or other driving member 24 to receive power from any suitable source. On the upper side of the plate gear wheel 18 are arranged bearing blocks 25 in which are journaled spindles 26 carrying rollers 27 adapted to rotate under and bear against the cam faces 15 on the ring or plate 8. As these rollers roll over the cam faces, the plate is caused to rise perpendicularly, and when the rollers ride off the cam faces 15 at the off-sets or steps 16, the plate or ring 8 falls or drops abruptly. It is understood that the plate or ring 8 does not rotate but is merely raised and dropped alternately. To relieve the friction, if any, to facilitate the easy rotation of the plate gear wheel, it rotates on rollers 28 carried by spindles 29 journaled in boxings or bearing blocks 30 upstanding from the interior of the base 7, as shown in Figure 5.

The ring or plate 8 is shown provided with a preferably centrally disposed eye 31, and spaced on either side thereof, preferably midway between the eye and the periphery of the ring or plate are short upstanding lugs 32, preferably rectangular in shape. From the periphery of the ring or plate 8, at the upper edge thereof and spaced suitably from each other are a plurality of slotted radially disposed ears 33, the function of which will be described.

When the several elements of the apparatus are in assembled relation, as shown in Figures 1, 2 and 3 the base 7 and ring 8 of the tamper are preferably located under that end of the apparatus having the trunnion receiving bearings 4, the vertical axis of the base and ring passing up between the adjoining rails 2 of the series or sets of rails, as shown in Figure 1, which places the lugs 32 on the plate or ring 8 centrally between the pairs of rails 3 of each set or series, looking down therebetween, as shown in Figure 1.

The lugs 32 fit in seats, not shown, in the lower ends of molds A, such as post molds which position and retain the lower ends of the molds positioned on the vertically movable tamper plate or ring 8. Such molds are preferably made of suitable lengths and of sections a, b, and one of said sections, preferably what may be termed the lower section is provided midway its length with laterally extending trunnions c, adapted to find seats in the bearings 4, and 5 as shown in Figures 1, 2 and 3.

When the molds A are in perpendicular position between the rails 2 with their lower ends resting on the plate or ring 8 and positioned by the lugs 32, the trunnions C, are disposed in the bearings 4 just above the rails and are permitted to move up and down in said bearings, as the plate or ring 8 is lifted and dropped alternately, said trunnions never coming into contact with the rails, thereby eliminating jar and noise. The up and down movement of the plate or ring 8 and consequently the up and down movement of the mold, particularly the latter movement, effectually tamps the material which may be poured into the mold, at the top, in any suitable manner. Such a mold as shown at A with reinforcing and centering means are described and claimed in my copending application bearing Serial No. 562,162 filed of even date herewith.

After the filling and tamping step, the mold is moved from the perpendicular dotted line position at the right of Figure 2, to the perpendicular dotted line position at the left in said figure, where the trunnions c are seated in the bearings 5 on the rails 2. In this position the mold is rotated to the horizontal dotted line position in Figure 2 with one end rested on a removable rest d laid on the rails 2. In this position the section a and b of the mold are unclamped to allow the top section to be removed, when by clamping a form, not shown, to the molded plastic substance, the mold may be turned over to permit the removal of the other section thereof, when the article on the form is transferred to any receiving base.

The mold described is used preferably for molding posts. In Figure 7 a culvert mold B is shown. To support a mold of this character on the plate or ring 8 and to guide it during tamping, I preferably connect to pairs of the ears 33 bars e and on these bars rest the mold. To hold such a mold as B in position I employ a clamping rod e' adjustably connected to the mold and adapted to be hooked in the eye 31, as shown in dotted lines in Figure 7.

What I claim is:—

1. In a machine of the character described, in combination, a base including an annular housing, a mold support non-rotatably arranged on said base but adapted to be raised and lowered, complementary guiding means on said base and support, an operating means, means within the base below the support and actuated by said operating means for raising and lowering said support, means on the support coacting with the actuating means to cause the support to alternately drop during the raising and lowering movement, and means on said support to receive and guide the lower ends of one or more molds.

2. In a machine of the character described, in combination, a base having an upstanding circular flange, a mold support having a depending circular flange and provided interiorly with a plurality of stepped cams, said flanges having complementary guiding elements, a revoluble member between said base and support, means for rotating said member, means on said member coacting with said cams to alternately raise and abruptly drop said support, and means on said support to receive and guide the lower ends of one or more molds.

In witness whereof, I have hereunto affixed my hand this 12th day of May, 1922.

DOLLIVER M. DEAN.